United States Patent
Hai et al.

(10) Patent No.: US 10,949,028 B2
(45) Date of Patent: Mar. 16, 2021

(54) TEXTURE RECOGNITION METHOD, TEXTURE RECOGNITION DEVICE AND DISPLAY DEVICE

(71) Applicant: BOE TECHNOLOGY GROUP CO., LTD., Beijing (CN)

(72) Inventors: Xiaoquan Hai, Beijing (CN); Haisheng Wang, Beijing (CN); Jian Gao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/504,499

(22) Filed: Jul. 8, 2019

(65) Prior Publication Data

US 2020/0125212 A1    Apr. 23, 2020

(30) Foreign Application Priority Data

Oct. 19, 2018    (CN) .......................... 201811223893.0

(51) Int. Cl.
*G06F 3/042* (2006.01)
*G06K 9/00* (2006.01)
(Continued)

(52) U.S. Cl.
CPC ......... *G06F 3/0421* (2013.01); *G06K 9/0004* (2013.01); *G09G 3/2092* (2013.01);
(Continued)

(58) Field of Classification Search
CPC .... G06K 9/001; G06K 9/0004; G06F 3/0421; G09G 3/3208; G09G 2360/145; G09G 3/2092; G09G 3/36
See application file for complete search history.

(56) References Cited

U.S. PATENT DOCUMENTS

2015/0104083 A1* 4/2015 Gu ....................... G06K 9/0004
                                                                  382/124
2017/0220839 A1* 8/2017 Yang .................... G06K 9/0004
(Continued)

FOREIGN PATENT DOCUMENTS

CN    105095855    11/2015
CN    105095887    11/2015
(Continued)

OTHER PUBLICATIONS

Cappelli, et al. "Minutia Cylinder-Code: A New Representation and Matching Technique for Fingerprint Recognition", IEEE Transactions on Pattern Analysis and Machien Intelligence, vol. 32, No. 12, Dec. 2010, pp. 2128-2141.
(Continued)

*Primary Examiner* — Kent W Chang
*Assistant Examiner* — Scott Au
(74) *Attorney, Agent, or Firm* — Calfee, Halter & Griswold LLP (57) ABSTRACT

A texture recognition method, a texture recognition device, and a display device. The texture recognition method includes: receiving a texture recognition signal by using a light blocking structure having a light transmission aperture; performing an amplification process on the texture recognition signal to obtain an amplified texture recognition signal; and detecting a valley line and a ridge line in a texture based on the amplified texture recognition signal.

12 Claims, 5 Drawing Sheets

(51) Int. Cl.
    *G09G 3/20*      (2006.01)
    *G09G 3/3208*    (2016.01)
    *G09G 3/36*      (2006.01)

(52) U.S. Cl.
    CPC ............. *G09G 3/3208* (2013.01); *G09G 3/36* (2013.01); *G09G 2360/145* (2013.01)

(56) References Cited

U.S. PATENT DOCUMENTS

2018/0300520 A1    10/2018  Lin et al.
2019/0034695 A1*   1/2019   Zhang .................. G06K 9/036

FOREIGN PATENT DOCUMENTS

| CN | 204808358 | 11/2015 |
| CN | 204926126 | 12/2015 |
| CN | 106874828 | 6/2017 |
| CN | 108227230 | 6/2018 |

OTHER PUBLICATIONS

Office action from Chinese Application No. 201811223893.0 dated May 21, 2020.
Multispectral Palmprint Image Fine Lines Extraction and Recognition, Jun. 2015, 133 pages.

* cited by examiner

TEXTURE RECOGNITION METHOD, TEXTURE RECOGNITION DEVICE AND DISPLAY DEVICE

RELATED APPLICATIONS

The present application claims the benefit of Chinese Patent Application No. 201811223893.0, filed on Oct. 19, 2018, the entire disclosures of which are incorporated herein by reference.

TECHNICAL FIELD

The present disclosure relates to the field of display technology, and particularly to a texture recognition method, a texture recognition device, and a display device.

BACKGROUND

In a process of optical texture recognition (e.g., optical fingerprint recognition), when the distance between the finger and the optical sensor is relatively large, the light may be scattered after being reflected by the finger or the like, thereby causing image blurring. Therefore, the texture information recognized based on light received by the optical sensor is not accurate.

SUMMARY

According to an exemplary embodiment, a texture recognition method is provided. The texture recognition method includes: receiving a texture recognition signal by using a light blocking structure having a light transmission aperture; performing an amplification process on the texture recognition signal to obtain an amplified texture recognition signal; and detecting a valley line and a ridge line in a texture based on the amplified texture recognition signal.

In an exemplary embodiment, the magnification of the amplification process is $1/\cos \theta$, $\theta = \arctan (d/4D)$; $\theta$ is a light collecting angle; and d indicates a distance between adjacent valley line and ridge line; D indicates a distance between an object having the texture to be detected and the light blocking structure.

In an exemplary embodiment, the texture recognition signal is a texture recognition electrical signal.

In an exemplary embodiment, the texture recognition signal is a texture recognition optical signal; before performing the amplification process on the texture recognition signal, the method further includes: converting the texture recognition optical signal into a texture recognition electrical signal.

In another exemplary embodiment, a texture recognition device is provided. The texture recognition device includes: a receiving module, an amplification module, and a detecting module. The receiving module includes a light blocking structure having a light transmission aperture, and the light transmission aperture is configured to receive a texture recognition signal. The amplification module is configured to perform an amplification process on the texture recognition signal to obtain an enlarged texture recognition signal. The detecting module is configured to detect a valley line and a ridge line in a texture based on the amplified texture recognition signal.

In an exemplary embodiment, the magnification of the amplification process is $1/\cos \theta$, $\theta = \arctan (d/4D)$; $\theta$ is a light collecting angle; and d indicates a distance between adjacent valley line and ridge line; D indicates a distance between an object having the texture to be detected and the light blocking structure.

In an exemplary embodiment, the texture recognition signal is a texture recognition electrical signal.

In an exemplary embodiment, the texture recognition signal is a texture recognition optical signal; before performing the amplification process on the texture recognition signal, the method further includes: converting the texture recognition optical signal into a texture recognition electrical signal.

In another exemplary embodiment, a display device is provided. The display device includes a display panel and the texture recognition device according to any one of the above-mentioned embodiments. The display panel includes a contact surface in contact with an object having the texture to be detected.

In an exemplary embodiment, the magnification of the amplification process is $1/\cos \theta$, $\theta = \arctan (d/4D)$; $\theta$ is a light collecting angle; and d indicates a distance between adjacent valley line and ridge line; D indicates a distance between an object having the texture to be detected and the light blocking structure.

In an exemplary embodiment, the receiving module includes a plurality of optical sensing units; an orthographic projection of the receiving module on the contact surface overlaps an orthographic projection of the light transmission aperture on the contact surface.

In an exemplary embodiment, the light blocking structure includes at least three light blocking layers disposed in a stack and at least two light transmitting layers; each light transmitting layer is located between adjacent light blocking layers; each light blocking layer includes a light transmission opening; orthographic projections of the light transmission openings of the at least three light blocking layers on the contact surface completely overlap each other.

In an exemplary embodiment, the light blocking structure is in direct contact with the receiving module.

In an exemplary embodiment, the display panel is an OLED display panel; the OLED display panel includes a display surface; the light blocking structure is located on a side of the display surface facing away from a light exit side of the OLED display panel.

In an exemplary embodiment, the display panel is a liquid crystal display panel; the liquid crystal display panel includes a display surface; the light blocking structure is located on a side of the display surface facing away from a light exit side of the liquid crystal display panel.

BRIEF DESCRIPTION OF THE DRAWINGS

In order to more clearly illustrate the technical solutions in exemplary embodiments of the disclosure or in the prior art, the appended drawings are used in the description of the exemplary embodiments or the prior art and will be introduced briefly in the following. Obviously, the drawings in the following description are only some embodiments of the disclosure, and for those of ordinary skills in the art, other drawings and embodiments may be obtained according to these drawings by one of ordinary skill in the art.

DETAILED DESCRIPTION OF THE DISCLOSURE

In the following, the technical solutions in embodiments of the disclosure will be described clearly and completely in connection with the drawings of the exemplary embodiments of the disclosure. Obviously, the described exemplary embodiments are only some of the embodiments of the disclosure, and not all of the embodiments. Based on the exemplary embodiments in the disclosure, all other embodiments may be obtained by those of ordinary skill in the art and should be considered to be included in the scope of the disclosure.

The present disclosure provides a texture recognition method, a texture recognition device, and a display device, which can reduce the required the accuracy of the optical sensor during a texture recognition process, and improve the accuracy of the texture recognition without changing the accuracy of the optical sensor.

The present disclosure provides an exemplary embodiment of a texture recognition method, which can be used in texture recognition of a texture recognition device. As can be seen from FIG. 1, an exemplary embodiment of the method can be specifically implemented by the following steps.

Figure 1:
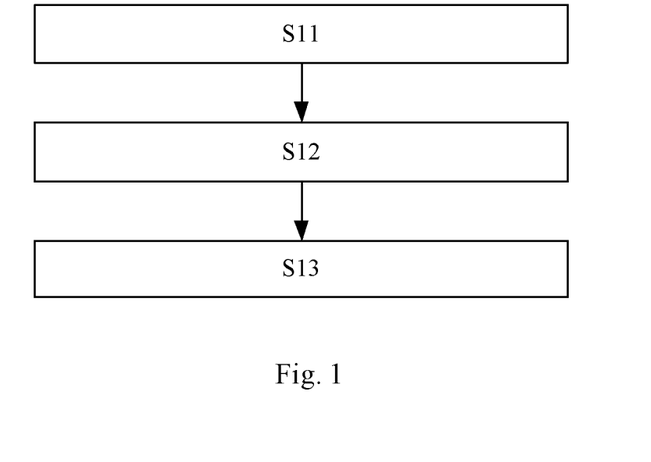
FIG. 1 is a flow chart of a texture recognition method according to an exemplary embodiment.

S11: receiving a texture recognition signal by using a light blocking structure having a light transmission aperture.

It should be noted that the valley line and the ridge line in the texture can be detected by using the texture recognition signal. The texture recognition signal may be a texture recognition optical signal or a texture recognition electrical signal.

Figure 2:
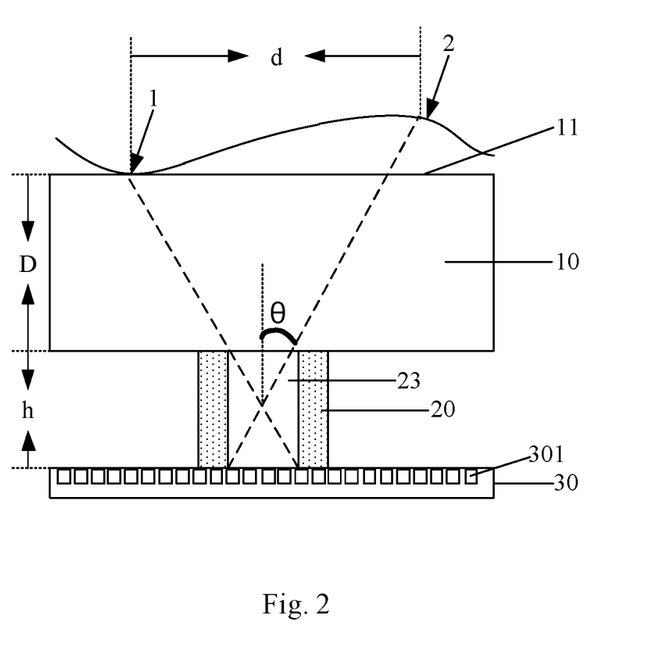
FIG. 2 is a structural schematic diagram of a texture recognition device according to an exemplary embodiment.
Figure 3:
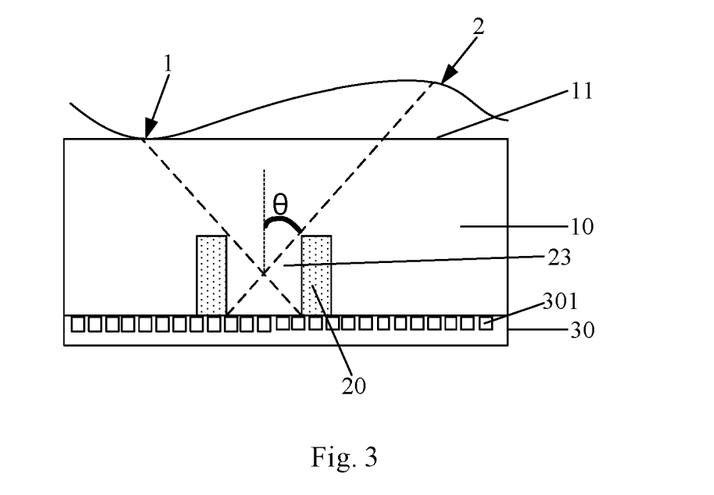
FIG. 3 is a structural schematic diagram of a texture recognition device according to an exemplary embodiment.
Figure 4:
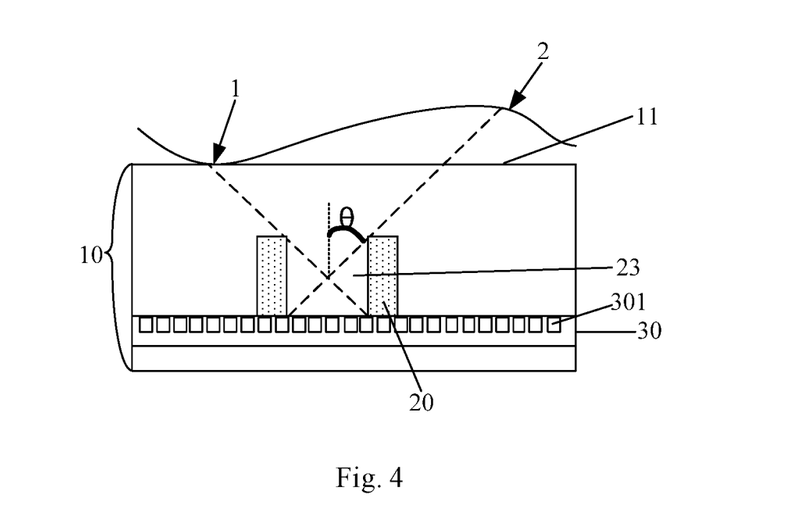
FIG. 4 is a structural schematic diagram of a texture recognition device according to an exemplary embodiment.

As shown in FIGS. 2-4, after the light reflected by the valley line 2 and the ridge line 1 is received by the optical sensor 30, a texture recognition optical signal is generated. Alternatively, after the light reflected by the valley line 2 and the ridge line 1 is received by the optical sensor 30, the optical sensor 30 can convert the texture recognition optical signal into a texture recognition electrical signal.

The texture recognition optical signal may be, for example, laser.

S12: performing an amplification process on the texture recognition signal to obtain an amplified texture recognition signal.

It should be noted that, for the exemplary embodiments disclosed, the compensation for the texture recognition signal can be realized by amplifying the texture recognition signal.

As shown in FIG. 2, the optical sensor 30 includes a plurality of optical sensing units 301. Each optical sensing unit corresponds to reflected light in a certain direction. For example, among the light rays reflected by the ridge line 1, the light intensity incident on the optical sensing unit 301 in the direction of angle θ is m, and the light intensity incident on the optical sensing unit 301 in a direction perpendicular to the optical sensor 30 is n. The inventors noticed that m=n×cos θ. Therefore, it is necessary to compensate the light intensity incident on the optical sensing unit 301 in the direction of angle θ, thereby representing the true light intensity reflected by the ridge line 1.

S13: detecting a valley line and a ridge line in a texture based on the amplified texture recognition signal.

Since there are differences between the texture recognition signal corresponding to the valley line and the texture recognition signal corresponding to the ridge line, the amplified texture recognition signal corresponding to the valley line is different from the amplified texture recognition signal corresponding to the ridge line. Therefore, the valley line and the ridge line in the texture can be detected.

Exemplary embodiments provide a texture recognition method. The compensation for the texture recognition signal is realized by performing the amplification process on the received texture recognition signal. Then, based on the amplified texture recognition signal, the valley line and the ridge line in the texture are detected. Compared with the prior art, the light intensity received by the optical sensor can be amplified, thereby reducing the accuracy requirements of the optical sensor during a texture recognition process. Therefore, the accuracy of the texture recognition can be improved without changing the accuracy of the optical sensor.

A texture on an object to be detected (for example, the object to be detected having a texture that is the surface of a finger or a palm) can be recognized by the texture recognition method.

In an exemplary embodiment, the magnification of the amplification process is $1/\cos \theta$, $\theta = \arctan(d/4D)$; $\theta$ is a light collecting angle; and d indicates a distance between adjacent valley line 2 and ridge line 1; D indicates a distance between an object having the texture to be detected and the light blocking structure.

Figure 5:
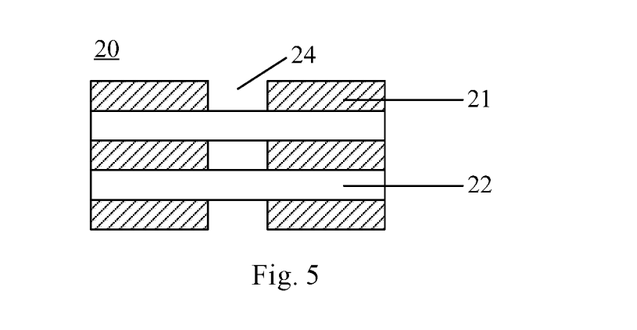
FIG. 5 is a structural schematic diagram of a light blocking structure according to an exemplary embodiment.

In an exemplary embodiment, as shown in FIG. 2, the light blocking structure 20 may be a light blocking layer including a plurality of light transmission apertures 23. Alternatively, as shown in FIG. 5, the light blocking structure 20 includes at least three light blocking layers 21 disposed in a stack and at least two light transmitting layers 22; each light transmitting layer 22 is located between adjacent light blocking layers 21; each light blocking layer 21 includes a light transmission opening 24; the orthographic projections of the light transmission openings 24 of the at least three light blocking layers 21 on the contact surface 11 (or, on the optical sensor 30) completely overlap each other. In an exemplary embodiment, the light blocking structure 20 is in direct contact with the optical sensor 30.

As shown in the exemplary embodiment of FIG. 2, the light blocking structure 20 and the optical sensor 30 are both disposed outside the display panel 10. As shown in the exemplary embodiment of FIG. 3, the light blocking structure 20 is disposed in the display panel 10, and the optical sensor 30 is disposed outside the display panel 10. As shown in the exemplary embodiment of FIG. 4, the light blocking structure 20 and the optical sensor 30 are both disposed in the display panel 10. In the case where the light blocking structure 20 is disposed in the display panel 10, the position of the light blocking structure 20 does not affect the normal display of the display panel 10.

If the light blocking structure 20 has the structure as shown in the exemplary embodiment of FIG. 5, the light blocking structure 20 and the optical sensor 30 may be disposed outside the display panel 10. Alternatively, the light blocking structure 20 and the optical sensor 30 may be disposed in the display panel 10.

In exemplary embodiments, the type of the display panel 10 is not limited as long as the light blocking structure 20 does not affect the normal display of the display panel 10. For example, the display panel 10 may be an OLED display panel or a liquid crystal display panel.

For example, in exemplary embodiments in which the display panel is an OLED display panel; the OLED display panel includes a display surface; the light blocking structure may be located on a side of the display surface facing away from a light exit side of the OLED display panel.

As shown in FIGS. 2-4, light rays having an incident angle greater than the light-receiving angle θ with respect to the normal to the contact surface 11 (or the optical sensor 30) cannot be received by the optical sensor 30 through the light-blocking structure 20.

The distance between adjacent valley lines 2 and the distance between adjacent ridge lines 1 may be approximately equal. The distance between adjacent valleys or adjacent ridges may be 100 to 450 μm, which is subject to practical application.

Of course, a light transmission aperture may transmit light reflected by a plurality of valley lines and a plurality of ridge lines. Alternatively, a light transmission aperture may also transmit light reflected by a plurality of valley lines and one ridge line. Alternatively, a light transmission aperture may also transmit light reflected by one valley line and a plurality of ridge lines. Accordingly, the size of the light-receiving angle θ may also be adjusted.

Figure 6:
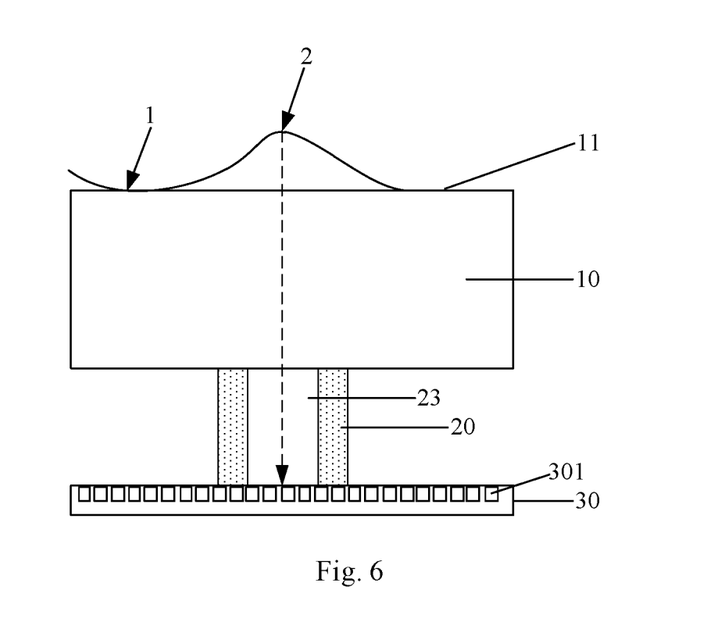
FIG. 6 is a structural schematic diagram of a texture recognition device according to an exemplary embodiment.

Further, as shown in FIG. 6, the light ray reflected by the valley line 2 is not blocked by the light blocking structure 20, and this light ray is irradiated onto the optical sensor 30. In this case, the light intensity received by the optical sensor 30 is not attenuated, and the light-receiving angle is considered to be 0°. As shown in FIGS. 2-4, the light blocking structure 20 blocks a portion of the light reflected by the valley line 2, and as the light-receiving angle θ increases, the light intensity received by the optical sensor 30 gradually decreases. In a range of the light-receiving angle [0°, arctan (d/4D)], the variation of the light intensity received by the optical sensor 30 can be approximated as variation of cosine in the range of [0°, arctan (d/4D)]. Therefore, in the case where the light-receiving angle θ=arctan (d/4D), the magnification of the amplification process is 1/cos θ. In this way, the texture recognition signal is compensated to represent the true light intensity of the texture detail corresponding to the light-receiving angle θ.

As can be seen from FIGS. 2-4, tan θ is actually equal to the ratio of d/4 to the distance from the contact surface to the intersection of the light rays constituting the light-receiving angle. Compared to the distance between the contact surface and the light-blocking structure 20, the distance between the surface of the light blocking structure 20 facing the contact surface and the intersection of the light rays constituting the light-receiving angle is negligible. Therefore, tan θ=d/4D.

In the embodiments of the present disclosure, the shape of the orthographic projection of the light transmission aperture of the light blocking structure 20 on the contact surface is not limited. For example, the shape of the orthographic projection of the light transmission aperture on the contact surface can be rectangular; in this case, the illuminance received by the optical sensor 30 is $$Q = \frac{I}{h}\left(\frac{L^2}{p^2}\right) * \cos\theta.$$

The shape of the orthographic projection of the light transmission aperture on the contact surface may also be circular; in this case, the illuminance received by the optical sensor 30 is $$Q = \frac{I}{h}\left(\frac{L^2}{4p^2}\pi\right) * \cos\theta.$$

In these formulas, I represents the light intensity of the light reflected by the valley line 2 and the ridge line 1; represents the thickness of the light blocking structure 20; p represents the distance between the centers of adjacent light transmission apertures. When the shape of the orthographic projection of the light transmission aperture on the contact surface is a rectangle, L represents the diagonal of the rectangle. When the shape of the orthographic projection of the light transmission aperture on the contact surface is a circle, L represents the diameter of the circle.

In an exemplary embodiment, the texture recognition signal is a texture recognition electrical signal.

In an exemplary embodiment, the texture recognition signal is a texture recognition optical signal. Before performing the amplification process on the texture recognition signal, the method further includes a step of converting the texture recognition optical signal into a texture recognition electrical signal.

It should be noted that the texture recognition device may further include a photoelectric conversion module, which can convert the texture recognition optical signal into the texture recognition electrical signal.

In exemplary embodiments, the amplification process is performed on the texture recognition optical signal (or the texture recognition electrical signal) to achieve amplification of the texture recognition signal.

Figure 7:
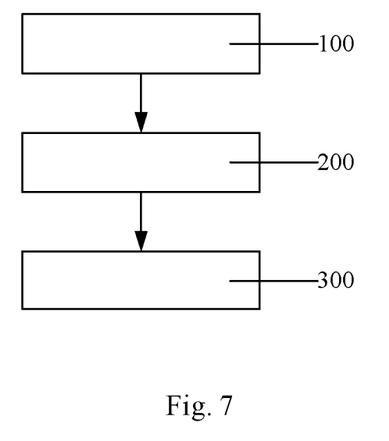
FIG. 7 is a diagram of relationship between modules in a texture recognition device according to an exemplary embodiment.

An exemplary embodiment provides a texture recognition device. As shown in FIG. 7, the texture recognition device includes: a receiving module 100, an amplification module 200, and a detecting module 300. The receiving module 100 includes a light blocking structure having a light transmission aperture, and the light transmission aperture is configured to receive a texture recognition signal. The amplification module 200 is configured to perform an amplification process on the texture recognition signal to obtain an enlarged texture recognition signal. The detecting module 300 is configured to detect a valley line and a ridge line in a texture based on the amplified texture recognition signal.

In the context of the disclosure, each "unit" and "module" in the embodiments can be realized by a computer (e.g. personal computer) or a combination of a computer and a suitable sensor; the processing of each "unit" and "module" can be realized e.g. by a processor in the computer. For example, the receiving module 100 can be implemented by the light blocking structure 20 and the optical sensor 30. The amplification module 200 can be implemented by a suitable amplification circuit. The detecting module 300 can be implemented by a processor.

After the light reflected by the valley line and the ridge line is irradiated to the optical sensor 30, the receiving module 100 is configured to receive the texture recognition optical signal transmitted by the optical sensor 30. Alternatively, after the light reflected by the valley line and the ridge line is irradiated to the optical sensor 30, the optical sensor 30 converts the texture recognition optical signal into a texture recognition electrical signal.

Exemplary embodiments provide a texture recognition device. The receiving module 100 receives the texture recognition signal, and the amplification module 200 performs the amplification process on the texture recognition signal received by the receiving module 100 to implement the compensation for the texture recognition signal. Then, based on the amplified texture recognition signal, the valley line and the ridge line in the texture are detected by the detecting module 300. Compared with the prior art, the light intensity received by the optical sensor 30 can be amplified, thereby reducing the requirements on the accuracy of optical sensor 30 during a texture recognition process. Therefore, the accuracy of the texture recognition can be improved without changing the accuracy of the optical sensor.

In an exemplary embodiment, the magnification of the amplification process is 1/cos θ, θ=arctan (d/4D); θ is a light collecting angle; and d indicates a distance between adjacent valley line 2 and ridge line 1; D indicates a distance between an object having the texture to be detected and the light blocking structure.

In an exemplary embodiment, as shown in FIG. 2, the light blocking structure 20 may be a light blocking layer including a plurality of light transmission apertures 23. Alternatively, as shown in FIG. 5, the light blocking structure 20 includes at least three light blocking layers 21 disposed in a stack and at least two light transmitting layers 22. Each light transmitting layer 22 is located between adjacent light blocking layers 21; each light blocking layer 21 includes a light transmission opening 24; the orthographic projections of the light transmission openings 24 of the at least three light blocking layers 21 on the contact surface 11 (or, on the optical sensor 30) completely overlap each other. In an exemplary embodiment, the light blocking structure 20 is in direct contact with the optical sensor 30.

As shown in FIG. 2, the light blocking structure 20 and the optical sensor 30 are both disposed outside the display panel 10. As shown in FIG. 3, the light blocking structure 20 is disposed in the display panel 10, and the optical sensor 30 is disposed outside the display panel 10. As shown in FIG. 4, the light blocking structure 20 and the optical sensor 30 are both disposed in the display panel 10. In the case where the light blocking structure 20 is disposed in the display panel 10, the position of the light blocking structure 20 does not affect the normal display of the display panel 10.

If the light blocking structure 20 has the structure as shown in FIG. 5, the light blocking structure 20 and the optical sensor 30 may be disposed outside the display panel 10. Alternatively, the light blocking structure 20 and the optical sensor 30 may be disposed in the display panel 10.

In an exemplary embodiment, the type of the display panel 10 is not limited as long as the light blocking structure 20 does not affect the normal display of the display panel 10. For example, the display panel 10 may be an OLED display panel or a liquid crystal display panel.

For example, the display panel is an OLED display panel; the OLED display panel includes a display surface; the light blocking structure may be located on a side of the display surface facing away from a light exit side of the OLED display panel.

As shown in FIGS. 2-4, light rays having an incident angle greater than the light-receiving angle θ with respect to the normal to the contact surface 11 (or the optical sensor 30) cannot be irradiated onto the optical sensor 30 through the light-blocking structure 20.

The distance between adjacent valley lines and the distance between adjacent ridge lines may be approximately equal. The distance between adjacent valleys or adjacent ridges may be 100 to 450 μm, which is subject to practical application.

Of course, a light transmission aperture may transmit light reflected by a plurality of valley lines and a plurality of ridge lines. Alternatively, a light transmission aperture may also transmit light reflected by a plurality of valley lines and one ridge line. Alternatively, a light transmission aperture may also transmit light reflected by one valley line and a plurality of ridge lines. Accordingly, the size of the light-receiving angle θ may also be adjusted.

Further, as shown in FIG. 6, the light ray reflected by the valley line 2 is not blocked by the light blocking structure 20, and this light ray is irradiated onto the optical sensor 30. In this case, the light intensity received by the optical sensor 30 is not attenuated, and the light-receiving angle is considered to be 0°. As shown in FIGS. 2-4, the light blocking structure 20 blocks a portion of the light reflected by the valley line 2, and as the light-receiving angle θ increases, the light intensity received by the optical sensor 30 gradually decreases. In a range of the light-receiving angle [0°, arctan (d/4D)], the variation of the light intensity received by the optical sensor 30 can be approximated as variation of cosine in the range of [0°, arctan (d/4D)]. Therefore, in the case where the light-receiving angle θ=arctan (d/4D), the magnification of the amplification process is 1/cos θ. In this way, the texture recognition signal is compensated to represent the true light intensity of the texture detail corresponding to the light-receiving angle θ.

As can be seen from FIGS. 2-4, tan θ is actually equal to the ratio of d/4 to the distance from the contact surface to the intersection of the light rays constituting the light-receiving angle. Compared to the distance between the contact surface and the light-blocking structure 20, the distance between the surface of the light blocking structure 20 facing the contact surface and the intersection of the light rays constituting the light-receiving angle is negligible. Therefore, tan θ=d/4D.

In exemplary embodiments, the shape of the orthographic projection of the light transmission aperture of the light blocking structure 20 on the contact surface is not limited. For example, the shape of the orthographic projection of the light transmission aperture on the contact surface can be rectangular; in this case, the illuminance received by the optical sensor 30 is $$Q = \frac{I}{h}\left(\frac{L^2}{p^2}\right) * \cos\theta.$$

The shape of the orthographic projection of the light transmission aperture on the contact surface may also be circular; in this case, the illuminance received by the optical sensor 30 is $$Q = \frac{I}{h}\left(\frac{L^2}{4p^2}\pi\right) * \cos\theta.$$

In these formulas, I represents the light intensity of the light reflected by the valley line 2 and the ridge line 1; h represents the thickness of the light blocking structure 20; p represents the distance between the centers of adjacent light transmission apertures. When the shape of the orthographic projection of the light transmission aperture on the contact surface is a rectangle, L represents the diagonal of the rectangle. When the shape of the orthographic projection of the light transmission aperture on the contact surface is a circle, L represents the diameter of the circle.

In an exemplary embodiment, the texture recognition signal is a texture recognition electrical signal.

In an exemplary embodiment, the texture recognition signal is a texture recognition optical signal. Before performing the amplification process on the texture recognition signal, the method further includes a step of converting the texture recognition optical signal into a texture recognition electrical signal.

It should be noted that the texture recognition device may further include a photoelectric conversion module, which can convert the texture recognition optical signal into the texture recognition electrical signal.

In exemplary embodiments, the amplification process is performed on the texture recognition optical signal (or the texture recognition electrical signal) to achieve amplification of the texture recognition signal.

Figure 8:
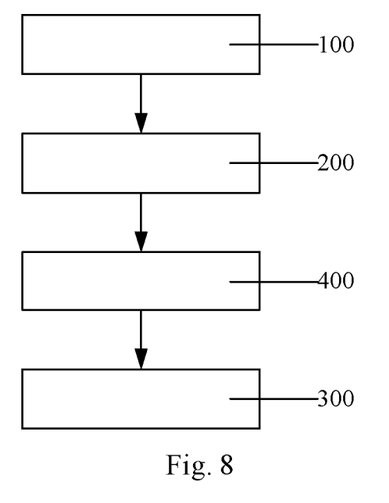
FIG. 8 is a structural schematic diagram of a texture recognition device according to an exemplary embodiment.

In an exemplary embodiment, as shown in FIG. 8, the texture recognition device further includes a photoelectric conversion module 400 configured to convert the texture recognition optical signal into a texture recognition electrical signal.

In exemplary embodiments, the amplification process is performed on the texture recognition optical signal (or the texture recognition electrical signal) to achieve amplification of the texture recognition signal.

An exemplary embodiment provides a display device. As shown in FIGS. 2-4, the display device includes a display panel 10 and the texture recognition device according to any one of the above-mentioned exemplary embodiments. The display panel 10 includes a contact surface in contact with an object having the texture to be detected.

Figure 9:
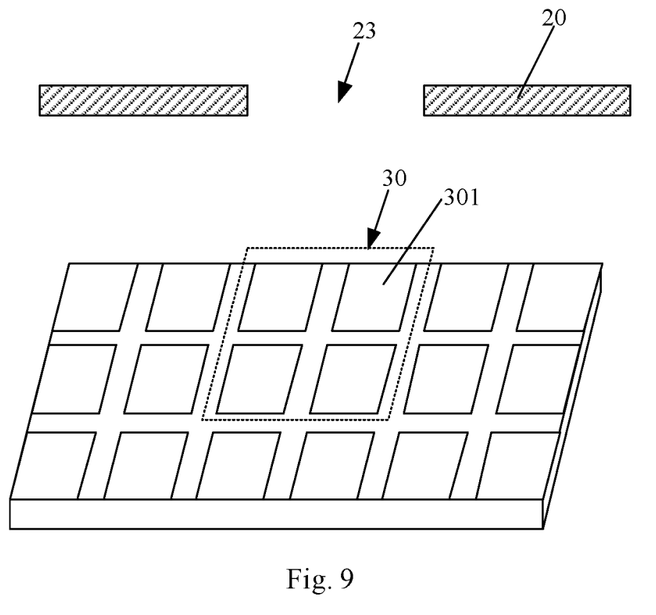
FIG. 9 is a schematic diagram of a light blocking structure and a receiving module according to an exemplary embodiment.

In an exemplary embodiment, as shown in FIG. 9, the receiving module may be an optical sensor and may include a plurality of optical sensing units 301; an orthographic projection of the receiving module on the contact surface overlaps an orthographic projection of the light transmission aperture 23 on the contact surface.

In exemplary embodiments, the type of the display panel 10 is not limited as long as the light blocking structure 20 does not affect the normal display of the display panel 10. For example, the display panel 10 may be an OLED display panel or a liquid crystal display panel.

For example, the display panel is an OLED display panel; the OLED display panel includes a display surface; the light blocking structure may be located on a side of the display surface facing away from a light exit side of the OLED display panel.

As shown in FIGS. 2-4, light rays having an incident angle greater than the light-receiving angle θ with respect to the normal to the contact surface 11 (or the optical sensor 30) cannot be irradiated onto the optical sensor 30 through the light-blocking structure 20.

The distance between adjacent valley lines and the distance between adjacent ridge lines may be approximately equal. The distance between adjacent valleys or adjacent ridges may be 100 to 450 μm, which is subject to practical application.

Of course, a light transmission aperture may transmit light reflected by a plurality of valley lines and a plurality of ridge lines. Alternatively, a light transmission aperture may also transmit light reflected by a plurality of valley lines and one ridge line. Alternatively, a light transmission aperture may also transmit light reflected by one valley line and a plurality of ridge lines. Accordingly, the size of the light-receiving angle θ may also be adjusted.

Further, as shown in FIG. 6, the light ray reflected by the valley line 2 is not blocked by the light blocking structure 20, and this light ray is irradiated onto the optical sensor 30. In this case, the light intensity received by the optical sensor 30 is not attenuated, and the light-receiving angle is considered to be 0°. As shown in FIGS. 2-4, the light blocking structure 20 blocks a portion of the light reflected by the valley line and as the light-receiving angle θ increases, the light intensity received by the optical sensor 30 gradually decreases. In a range of the light-receiving angle [0°, arctan (d/4D)], the variation of the light intensity received by the optical sensor 30 can be approximated as variation of cosine in the range of [0°, arctan (d/4D)]. Therefore, in the case where the light-receiving angle θ=arctan (d/4D), the magnification of the amplification process is 1/cos θ. In this way, the texture recognition signal is compensated to represent the true light intensity of the texture detail corresponding to the light-receiving angle θ.

As can be seen from FIGS. 2-4, tan θ is actually equal to the ratio of d/4 to the distance from the contact surface to the intersection of the light rays constituting the light-receiving angle. Compared to the distance between the contact surface and the light-blocking structure 20, the distance between the surface of the light blocking structure 20 facing the contact surface and the intersection of the light rays constituting the light-receiving angle is negligible. Therefore, tan θ=d/4D.

In exemplary embodiments, the shape of the orthographic projection of the light transmission aperture of the light blocking structure 20 on the contact surface is not limited. For example, the shape of the orthographic projection of the light transmission aperture on the contact surface can be rectangular; in this case, the illuminance received by the optical sensor 30 is $$Q = \frac{I}{h}\left(\frac{L^2}{p^2}\right) * \cos\theta.$$

The shape of the orthographic projection of the light transmission aperture on the contact surface may also be circular; in this case, the illuminance received by the optical sensor 30 is $$Q = \frac{I}{h}\left(\frac{L^2}{4p^2}\pi\right) * \cos\theta.$$

In these formulas, I represents the light intensity of the light reflected by the valley line 2 and the ridge line 1; h represents the thickness of the light blocking structure 20; p represents the distance between the centers of adjacent light transmission apertures. When the shape of the orthographic projection of the light transmission aperture on the contact surface is a rectangle, L represents the diagonal of the rectangle. When the shape of the orthographic projection of the light transmission aperture on the contact surface is a circle, L represents the diameter of the circle.

In an exemplary embodiment, the texture recognition signal is a texture recognition electrical signal.

In an exemplary embodiment, the texture recognition signal is a texture recognition optical signal. Before performing the amplification process on the texture recognition signal, the method further includes a step of converting the texture recognition optical signal into a texture recognition electrical signal.

It should be noted that the texture recognition device may further include a photoelectric conversion module, which can convert the texture recognition optical signal into the texture recognition electrical signal.

In exemplary embodiments, the amplification process is performed on the texture recognition optical signal (or the texture recognition electrical signal) to achieve amplification of the texture recognition signal.

In exemplary embodiments, the number of the optical sensing units 301 in the optical sensor 30 is not limited. Specifically, the number of the optical sensing units 301 is related to the light transmission aperture 23 and the area of the optical sensing unit 301.

According to an exemplary embodiment, the entire display area of the display device may be used for texture recognition. Alternatively, a portion of the display area of the display device can be used for texture recognition, such as under-display fingerprint recognition.

Display devices provided by exemplary embodiments has the same technical effects as the foregoing texture recognition device, and details are not described herein again.

Exemplary embodiments provide a texture recognition method, a texture recognition device, and a display device. The compensation for the texture recognition signal is realized by performing the amplification process on the received texture recognition signal. Then, based on the amplified texture recognition signal, the valley line and the ridge line in the texture are detected. Compared with the prior art, the light intensity received by the optical sensor can be amplified, thereby reducing the requirements on the accuracy of the optical sensor during a texture recognition process. Therefore, the accuracy of the texture recognition can be improved without changing the accuracy of the optical sensor.

The above exemplary embodiments are only used for explanations rather than limitations to the present disclosure, the ordinary skilled person in the related technical field, in the case of not departing from the spirit and scope of the present disclosure, may also make various modifications and variations, therefore, all the equivalent solutions also belong to the scope of the present disclosure, the patent protection scope of the present disclosure should be defined by the claims.

What is claimed is:

1. A texture recognition method, comprising:
   receiving a texture recognition signal by using a light blocking structure having a light transmission aperture;
   performing an amplification process on the texture recognition signal to obtain an amplified texture recognition signal; and
   detecting a valley line and a ridge line in a texture based on the amplified texture recognition signal;
   wherein magnification of the amplification process is $1/\cos\theta$, $\theta=\arctan(d/4D)$; $\theta$ is a light collecting angle, and d indicates a distance between adjacent valley line and ridge line; D indicates a distance between an object having the texture to be detected and the light blocking structure.

2. The texture recognition method according to claim 1, wherein the texture recognition signal is a texture recognition electrical signal.

3. The texture recognition method according to claim 1, wherein the texture recognition signal is a texture recognition optical signal; before performing the amplification process on the texture recognition signal, the method further comprises:
   converting the texture recognition optical signal into a texture recognition electrical signal.

4. A texture recognition device comprising: a receiving module, an amplification module, and a detecting module;
   wherein the receiving module comprises a light blocking structure having a light transmission aperture, and the light transmission aperture is configured to receive a texture recognition signal;
   wherein the amplification module is configured to perform an amplification process on the texture recognition signal to obtain an enlarged texture recognition signal;
   and wherein the detecting module is configured to detect a valley line and a ridge line in a texture based on the amplified texture recognition signal,
   wherein magnification of the amplification process is $1/\cos\theta$, $\theta=\arctan(d/4D)$; $\theta$ is a light collecting angle, and d indicates a distance between adjacent valley line and ridge line; D indicates a distance between an object having the texture to be detected and the light blocking structure.

5. The texture recognition device according to claim 4, wherein the texture recognition signal is a texture recognition electrical signal.

6. The texture recognition device according to claim 4, wherein the texture recognition signal is a texture recognition optical signal; before performing the amplification process on the texture recognition signal, the method further comprises: converting the texture recognition optical signal into a texture recognition electrical signal.

7. A display device comprising a display panel and the texture recognition device according to claim 4; wherein the display panel comprises a contact surface in contact with an object having the texture to be detected.

8. The display device according to claim 7, wherein the receiving module comprises a plurality of optical sensing units; an orthographic projection of the receiving module on the contact surface overlaps an orthographic projection of the light transmission aperture on the contact surface.

9. The display device according to claim 7, wherein the light blocking structure comprises at least three light blocking layers disposed in a stack and at least two light transmitting layers; each light transmitting layer is located between adjacent light blocking layers; each light blocking layer comprises a light transmission opening; orthographic projections of the light transmission openings of the at least three light blocking layers on the contact surface completely overlap each other.

10. The display device according to claim 7, wherein the light blocking structure is in direct contact with the receiving module.

11. The display device according to claim 7, wherein the display panel is an OLED display panel; the OLED display panel comprises a display surface; the light blocking structure is located on a side of the display surface facing away from a light exit side of the OLED display panel.

12. The display device according to claim 7, wherein the display panel is a liquid crystal display panel; the liquid crystal display panel comprises a display surface; the light blocking structure is located on a side of the display surface facing away from a light exit side of the liquid crystal display panel.

* * * * *